United States Patent [19]

Moisin

[11] Patent Number: 4,922,531
[45] Date of Patent: May 1, 1990

[54] LINE INTERFACE CIRCUIT

[75] Inventor: Mihail S. Moisin, Toronto, Canada

[73] Assignee: Northern Telecom Limited, Montreal, Canada

[21] Appl. No.: 359,551

[22] Filed: Jun. 1, 1989

[30] Foreign Application Priority Data

Apr. 19, 1989 [CA] Canada .................................... 597217

[51] Int. Cl.⁵ .............................................. H04B 3/03
[52] U.S. Cl. .................... 379/413; 379/402; 379/405
[58] Field of Search ............... 379/413, 405, 402, 398, 379/399, 345, 403

[56] References Cited

U.S. PATENT DOCUMENTS

| | | | |
|---|---|---|---|
| 4,197,431 | 4/1980 | Vis | 379/413 |
| 4,415,777 | 11/1983 | Agnew | 379/345 |
| 4,600,811 | 7/1986 | Hayashi et al. | 379/405 |
| 4,829,567 | 5/1989 | Moison | 379/405 |

Primary Examiner—Jin F. Ng
Assistant Examiner—Jhancy Augustus
Attorney, Agent, or Firm—J. E. Moorhouse

[57] ABSTRACT

A telephone line interface circuit includes a transformer with tip and ring windings connected between tip and ring feed resistors and tip and ring leads of a telephone line for feeding energizing current from telephone facility to the telephone line. A secondary winding in combination with the tip and ring windings couples a.c. signals between the facility. A capacitance is connected in combination with the secondary winding to simulate a function of a capacitance as would normally be connected between the tip and ring windings in prior art circuits, but without the problem of feed resistor interference at lower voice band frequencies. Network and component values are inserted between the secondary winding and an electronic hybrid circuit whereby the line circuit is precisely tailored for anyone of several national telephone line standards.

5 Claims, 3 Drawing Sheets

LINE INTERFACE CIRCUIT

INTRODUCTION

The invention is in the field of telephony and relates to line interface circuits for coupling energizing current to a telephone line and for transformer coupling signals between the telephone line and an associated telephone facility.

BACKGROUND OF THE INVENTION

In a typical telephone switching system, line interface circuits are used to provide resistive direct current coupling and alternating current transformer coupling to a subscriber telephone line served by the system. The line interface circuit usually comprises a transformer having a primary winding being split into equal halves for connection to tip and ring leads of the subscriber line and a secondary winding for connection to a hybrid circuit. Energizing direct current is supplied via tip and ring feed resistors and the split primary winding for operation of a telephone instrument or the like, connected at the far end of the telephone line. The line interface circuit may also include a tertiary winding, sometimes referred to as a balance winding, similar to that disclosed by V. V. Korsky in U.S. Pat. No. 4,103,112 issued on July 25, 1978. In any case the halves of the split primary winding are connected in series by a capacitor which conducts a.c. signal currents. If it were not for the capacitor, the a.c. signal currents would otherwise have to traverse the tip and ring feed resistors. The capacitance value of the capacitor is a critical factor in defining one of the component values of the terminating impedance of the line interface circuit. Therefore, within an operating territory of any telephone company this capacitance value for any particular family of line interface circuit types is predetermined.

One problem with this circuit is that its return loss characteristic in a lower portion of the voice band is at variance with that ideally required by many of the telephony standards setting organizations. For example, in North America the so-called regional operating telephone companies usually adopt operating standards referred to as the Local Area Telecommunications Authority Switching Systems General Requirements, (LSSGR). The telephone line termination standard is simply defined in terms of passive electrical components. Particularly throughout most of North America, the a.c. terminating characteristics of a line interface circuit, being connected to terminate a telephone line, are to be that of a 900 ohm resistor connected in series with a 2.16 microfarad capacitor, while the a.c. characteristic of the line is that of 800 ohms of resistance in parallel with a series combination of 100 ohms of resistance and 0.05 microfarads of capacitance. In China, for example, the ac terminating characteristics of a line interface circuit are specified as being 0.22 microfarads of capacitance in parallel with 1 kilohm of resistance all in series with 300 ohms of resistance, while the ac characteristic of the line is represented by 0.16 microfarads of capacitance in parallel with 710 ohms of resistance, all in series with 330 ohms of resistance. In Morocco, for another example, the a.c. terminating characteristic of a line interface circuit is specified as being 600 ohms of resistance, while the a.c. characteristic of the line is represented by 0.15 microfarads of capacitance in parallel with 210 ohms of resistance all in series with 880 ohms of resistance. The characteristic determining structure in the line circuit, as described in the previously mentioned patent, is that of tip and ring transformer windings being connected in series with a direct current blocking capacitor, across the telephone line. The capacitive requirement is provided by the value of the capacitor and the resistance requirement is provided by a resistive termination of a secondary winding in the transformer.

This structure would be perfectly satisfactory if it were not for the presence of tip and ring feed resistors which function to provide a path for direct energizing current flow for operation of the telephone line. As discussed in my application for patent, Ser. No. 199,745, filed May 26, 1988 with the title "TELEPHONE LINE INTERFACE CIRCUIT", the tip and ring feed resistors are usually of a sum total resistance of about 400 ohms, but can be of greater or lesser value. This 400 ohm value strikes a compromise between reasonable length of serviceable telephone line and maximum line current in a short line. As is well known, the impedance of any capacitive element varies inversely with frequency. In the case of the line circuit, voice frequency signals of less than about 500 Hz are effectively split between two significantly conductive paths, one being the intended path provided by the capacitor and the other being the unintended path of the tip and ring feed resistors in series with the battery source.

Recently, yet another problem has been recognised. In some operating telephone companies wherein a telemetry service has been introduced. The telemetry service is intended to provide a metered measure, of a supplied commodity; water, electricity, or pay television for example, to the supplier of the commodity via the telephone system. In one such arrangement, telemetry equipment at the subscriber's premise is poled in response to a reversal of the polarity of the energizing current being applied at the line interface circuit. In such instant the accumulated charge, in the capacitor connected between the tip and ring halves of the split primary winding, causes a current surge along the telephone line. Sometimes the current surge is sufficient to induce a momentary operation of the ringer in the subscriber's telephone instrument. As telemetry is conveniently performed while the subscriber's station set is in an idle condition, it is therefore usually performed sometime during the first few hours following midnight, that is when telephones are least likely to be in use. At such times, a momentary operation of the ringer in the subscriber's telephone instrument can be annoying, particularly for those telephone subscribers who are light sleepers. A specific solution for this problem is the subject of my application for patent filed on about Mar. 15, 1989, with the title "LINE INTERFACE CIRCUIT".

It is an object of the invention to provide a line interface circuit, for a telephone line, which is economically adaptable for use in various countries having various national telephone line matching impedance standards. It is also an object of the invention to provide a line interface circuit for a telephone line, wherein the effect of tip and ring feed resistor shunting of the prescribed alternating current capacitive reactance is substantially avoided.

It is a further object of the invention to provide a line interface circuit wherein the offending accumulated charge is substantially avoided so that the incidence or intensity of false ringer response to switching of battery polarity is reduced.

SUMMARY OF THE INVENTION

In accordance with the invention, a line interface circuit for energizing tip and ring leads of a communication line, with direct current from a power source, and for coupling alternating current signals between the communication line and a telephone facility, includes tip and ring terminals for connection to the tip and ring leads and first and second battery terminals for connection to the power source. Tip and ring feed resistors (Rf), of similar ohmic values, are each connected to a respective one of the battery terminals. A transformer includes tip and ring primary windings connected in series between the tip terminal and the tip feed resistor and the ring terminal and the ring feed resistor respectively. The transformer also includes a secondary winding having first and second ends. An electronic hybrid circuit includes transmit and receive ports for connection to the telephone facility, a pair of voltage outputs and an input. A first resistance (Ro) is connected in series between one of the pair of voltage outputs and the first end of the secondary winding. A first impedance (Z1) is connected in series between another of the pair of voltage outputs and the second end of the secondary winding. A pair of resistances is connected in series between the first end and another of the pair of voltage outputs, each (R) of the pair of resistances being of similar ohmic values. An amplifier includes an input being connected to the junction of the pair of resistances, an output being connected to the input of the hybrid circuit, and a negative feedback path having a second impedance (Z2) being connected in series between the input and the output of the amplifier. A third impedance (Z3) is connected in series between said one voltage output and said junction.

In a general example in accordance with the invention, the line interface circuit may be designed to interface a line of a given impedance (Zt) with a required terminating impedance (Zo). In this case, the values of said impedances (Z1, Z2, and Z3) are substantially as follows:

Z1 is approximately equal to Zo−(2Rf+Ro),
Z2 is equal to (R/Ro) Zo, and
Z3 is equal to (R/Ro)((Zo +Zt)/2).

Also in accordance with the invention, a line circuit of the type described is mass producible with deterministic components (R, Ro, Z1, Z2 and Z3) being incorporated therein as a modular network.

BRIEF DESCRIPTION OF THE DRAWINGS

Example embodiments of a line interface circuit in accordance with the invention are discussed with reference to the accompanying drawings, in which.

DESCRIPTION

Figure 1:
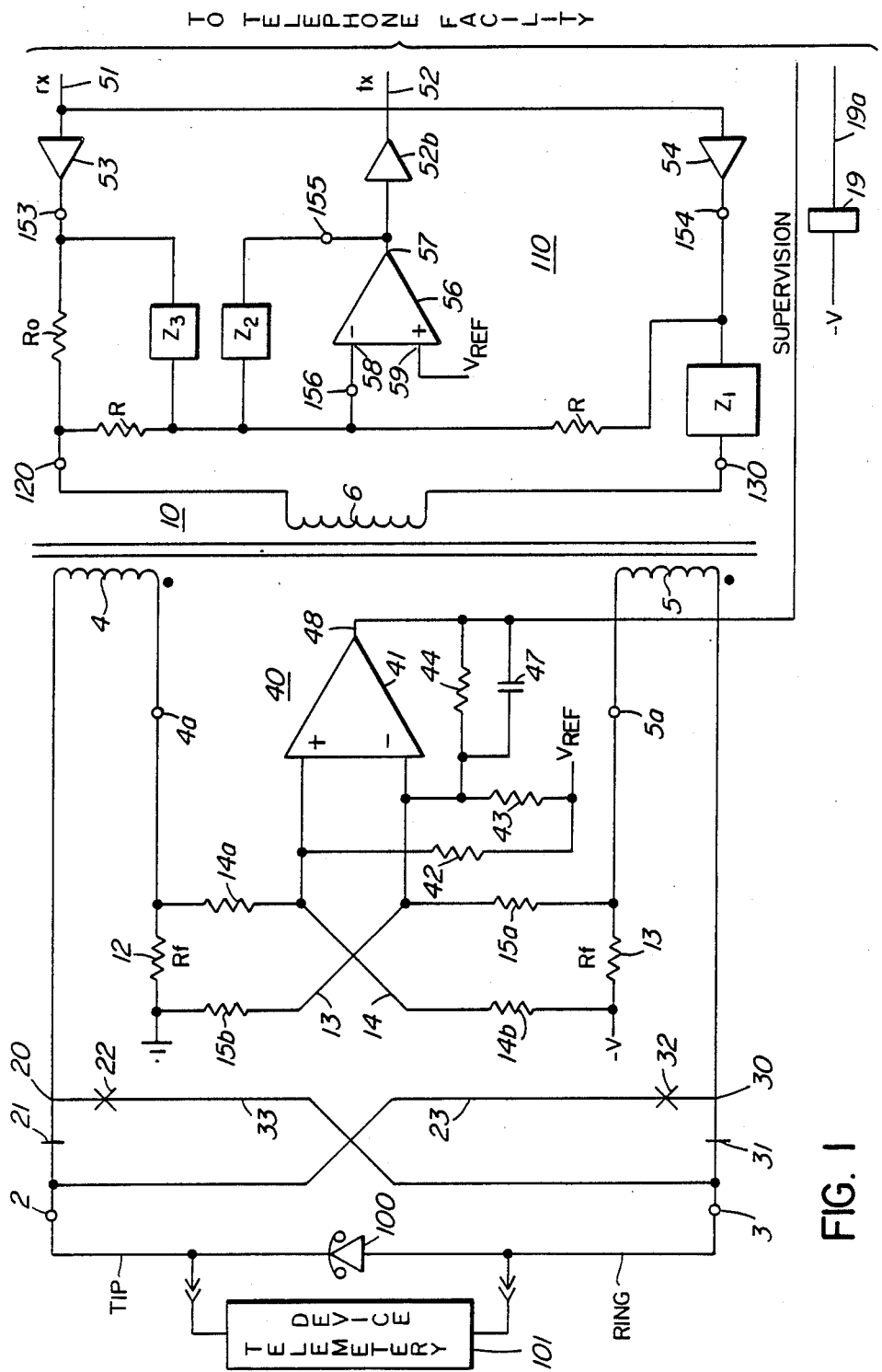
FIG. 1 is a schematic diagram of the line interface circuit.

Referring to FIG. 1, a telephone instrument 100 is illustrated as being connected to a telephone facility (not shown) via tip and ring leads and the line interface circuit. The tip and ring leads are connected to tip and ring terminals 2 and 3. A transformer 10 includes tip and ring primary windings 4 and 5 which are connected between ground and negative polarity (−V) terminals of an office battery supply and the tip and ring terminals 2 and 3. Thus connected, battery voltage is normally applied across the telephone instrument 100 such that when the telephone instrument 100 is in an OFF HOOK state, energizing direct current traverses tip and ring feed resistors 12 and 13, the tip and ring primary windings 4 and 5, BREAK contact portions 21 and 31 of tip and ring transfer contacts 20 and 30, the tip and ring terminals 2 and 3 and the tip and ring leads to operate the telephone instrument 100. The transformer 10, also includes a secondary winding 6 with ends connected at terminals 120 and 130. Amplifiers 53 and 54 are connected to receive signals from the telephone facility, via an input lead 51, and to couple corresponding and inverted voltage replicas thereof to terminals 153 and 154. An amplifier 56 includes an inverting input 58 connected to a terminal 156, an input 59 connected to a reference voltage V ref, and an output 57 connected to a terminal 155 and an input of a buffer amplifier 56b. An output of the buffer amplifier is connected with an output lead 52 for transmitting signals to the telephone facility. The secondary winding 6 is essential for providing a coupling for alternating current signals between the telephone facility and the telephone instrument 100. Alternating current signals traverse the same circuit elements as previously described in relation to the energizing direct current, with the exception of the feed resistors 12 and 13. Normally, in accordance with traditional design of line interface circuits, points labeled 4a and 5a in the drawing are connected by a capacitive element which carries most of the a.c. signal energy between the tip and ring windings and provides the specified terminating capacitive reactance. In this example, both the capacitive reactance and resistive termination component values are provided in a network 110, which is connected as shown via the terminals 120, 130, 153-156. When the line interface circuit is operating, both the resistive and the reactive components of the impedance characteristic of the circuit are coupled, via the transformer windings. The network 110 includes components and/or networks R, Ro, Z1, Z2 and Z3 connected as shown. The required component and network values which provide a desired terminating impedance are calculated with respect to the previously discussed values of Zo and Zt as follows:

Z1 is approximately equal to Zo −(2Rf +Ro),
Z2 is equal to (R/Ro) Zo, and
Z3 is equal to (R/Ro)((Zo +Zt)/2).

Figure 2:
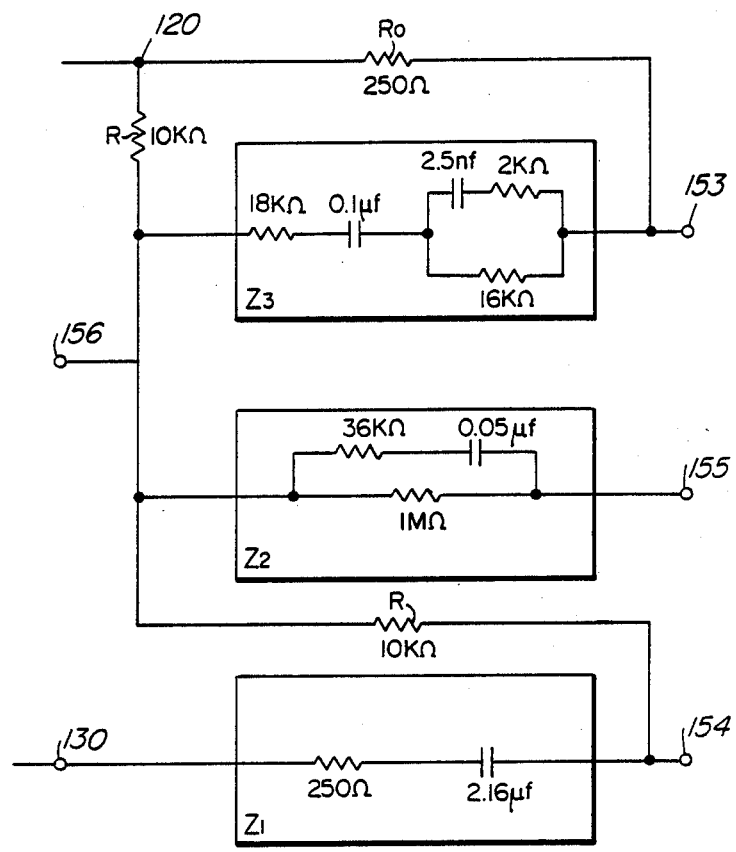
FIG. 2 is a schematic diagram of exemplary components and networks useful for characterizing operation of the line interface circuit for North America, wherein the value of Rf is 200 ohms.
Figure 4:
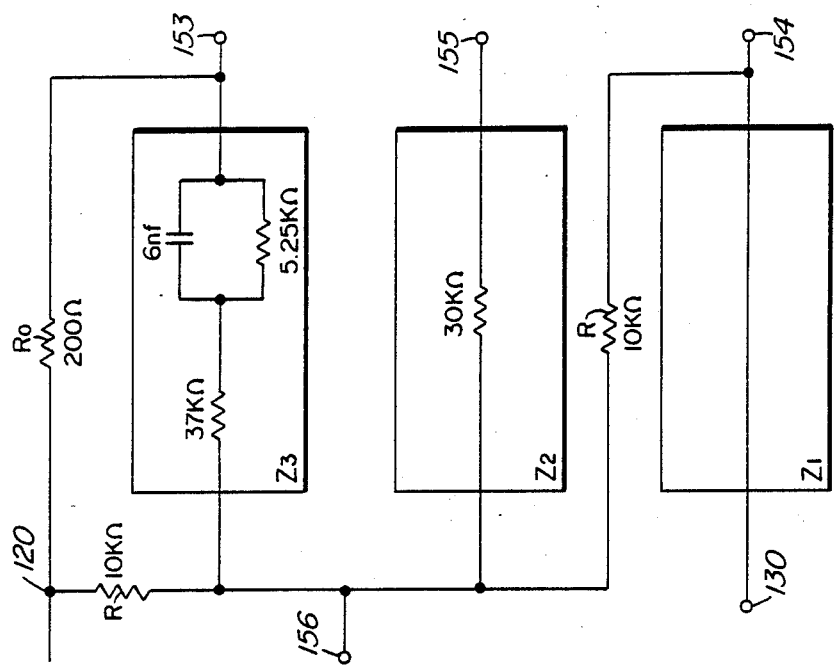
FIG. 4 is a schematic diagram of exemplary components and networks useful for characterizing operation of the line interface circuit for Morocco, wherein the value of Rf is 200 ohms.
Figure 3:
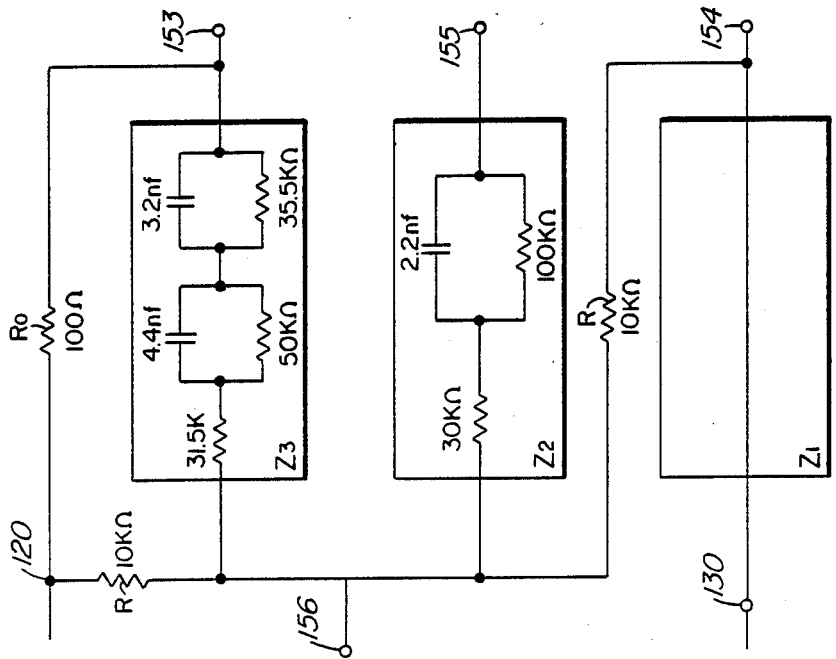
FIG. 3 is a schematic diagram of exemplary components and networks useful for characterizing operation of the line interface circuit for China, wherein the value of Rf is 100 ohms.

A convenient value of R may be in a range of 50,000 and 500,000 ohms. Convenient values for Ro and the tip and ring feed resistors Rf may be in a range of 50 and 500 ohms. The feed resistors are preferably matched to within 1% of each other. The values of components as illustrated in FIG. 2, provide an equivalent to the impedance characteristic of 900 ohms resistance connected in series with 2.16 microfarads capacitance, in the voice band, when measured at the tip and ring terminals.

Control of normal polarity and reverse polarity energizing of the communication line is effected by the transfer of contacts 20 and 30 which are operated by a relay armature, symbolized at 19, and which is controlled by the telephone facility. In the event that a telemetry device 101 is connected to the communication line, it is connected in parallel with the telephone instrument 100. An understanding of the operation of the telemetry device 101 is not pertinent to understanding the function of the line interface circuit. It is sufficient to assume that in the event that battery reversal occurs, the telemetry device is designed to transmit whatever data it may have, via the telephone line. The data may be sent by various signalling formats, examples being, dial-like pulse signals, in band single frequency or frequency shift signals, or DTMF signals. To activate the telemetry device 101, the telephone facility operates the transfer contacts 20 and 30 by grounding a lead 19a. This causes the BREAK contact portions 21 and 31 to open, and thereafter MAKE contact portions 22 and 32 close. Thus, energizing current is rerouted via leads 23 and 33 to effect a reversal of the battery polarity at the tip and ring terminals 2 and 3.

The line circuit in the figure is intended to be a direct replacement for line circuits typically used in telephone switching facilities and is intended to have no significant impact on any of the operations of same. Signalling and supervision is detected at the line circuit by the use of a differential amplifier circuit 40 which includes a differential amplifier 41 having inverting and non-inverting inputs and an output 48. Resistors 41–44 are connected in the differential amplifier circuit 40, as shown. The inputs of the differential amplifier circuit are connected across tip and ring voltage dividers, which are provided by resistors 14a, 14b, 15a and 15b, as shown. This arrangement is similar to that discussed in the previously mentioned patent to V. V. Korsky. This arrangement can also be utilized, in combination with appropriate circuitry, to provide magnetic flux cancellation as is preferred in present day line interface circuits. A 0.033 microfarad capacitor 47 may be connected with the resistor 44, being of 14 kilohms, to simulate rise and fall characteristics of dial pulsing and ON HOOK, OFF HOOK state transitions, at the output 48, so that the supervisory signal characteristics are generally similar to those characteristics as they would be were a capacitor connected between the points 4a and 5a.

I claim:

1. A line interface circuit for energizing tip and ring leads of a communication line with direct current from a power source and for coupling alternating current signals between the communication line and a telephone facility, comprising:
   tip and ring terminals for connection to the tip and ring leads;
   first and second battery terminals for connection to the power source;
   tip and ring feed resistors (Rf) each connected to a respective one of the battery terminals, the tip and ring feed resistors being of similar ohmic values;
   a transformer including tip and ring primary windings connected in series between the tip terminal and the tip feed resistor and the ring terminal and the ring feed resistor respectively, and a secondary winding having first and second ends;
   an electronic hybrid circuit including transmit and receive ports for connection to the telephone facility, a pair of voltage outputs and an input;
   a first resistance (Ro) being connected in series between one of the pair of voltage outputs and the first end of the secondary winding;
   a first impedance (Z1) being connected in series between another of the pair of voltage outputs and the second end of the secondary winding;
   a pair of resistances being connected in series between the first end and other end of the pair of voltage outputs, each (R) of the pair of resistances being of similar ohmic values one with respect to another;
   an amplifier including an input being connected to the junction of the pair of resistances, an output being connected to the input of the hybrid circuit, and a negative feedback path;
   a second impedance (Z2) being connected in series with the negative feedback path; and
   a third impedance (Z3) being connected in series between said one voltage output and said junction.

2. A line interface circuit as defined in claim 1 further comprising:
   a switch means connected between the tip and ring terminals and the primary windings, and being operable for reversing the polarity of the energizing direct current normally applied to the communication line.

3. A line interface circuit as defined in claim 2 wherein the switch means comprises:
   tip and ring transfer contacts each connected in series between a respective one of the tip and ring terminals and the primary windings.

4. A line interface circuit as defined in claim 1 for interfacing a line of a given impedance (Zt) with a required terminating impedance (Zo) wherein the values of said impedances (Z1, Z2, and Z3) are substantially as follows:
   Z1 is approximately equal to Zo −(2Rf +Ro),
   Z2 is equal to (R/Ro) Zo, and
   Z3 is equal to (R/Ro)((Zo +Zt)/2).

5. A line interface circuit as defined in claim 4 wherein the value of the resistance (R) is in a range of 50 kilohms to 500 kilohms and the value of the first resistance (Ro) and (Rf) are in a range of 50 to 500 ohms.

* * * * *